A. C. STEWART.
CENTRIFUGAL PUMP.
APPLICATION FILED JUNE 1, 1920.

1,406,297.

Patented Feb. 14, 1922.

Inventor:
Alfred C. Stewart
By Arthur P. Knight
Attorney

UNITED STATES PATENT OFFICE.

ALFRED C. STEWART, OF LOS ANGELES, CALIFORNIA.

CENTRIFUGAL PUMP.

1,406,297.  Specification of Letters Patent.  Patented Feb. 14, 1922.

Application filed June 1, 1920. Serial No. 385,575.

*To all whom it may concern:*

Be it known that I, ALFRED C. STEWART, a citizen of the United States, residing at Los Angeles, in the county of Los Angeles and State of California, have invented a new and useful Centrifugal Pump, of which the following is a specification.

This invention relates to a rotary centrifugal pump and the main object of the present invention is to provide a simple and effective pump construction and particularly to provide means for variation or adjustment of the capacity or output of such a pump.

The accompanying drawings illustrate an embodiment of my invention, and referring thereto:

Figure 1:
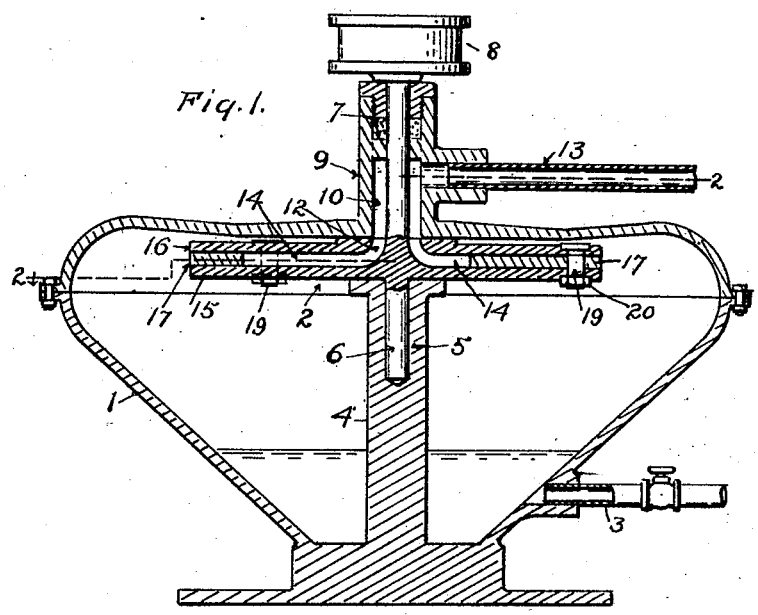
Fig. 1 is a vertical section of the pump.
Figure 2:
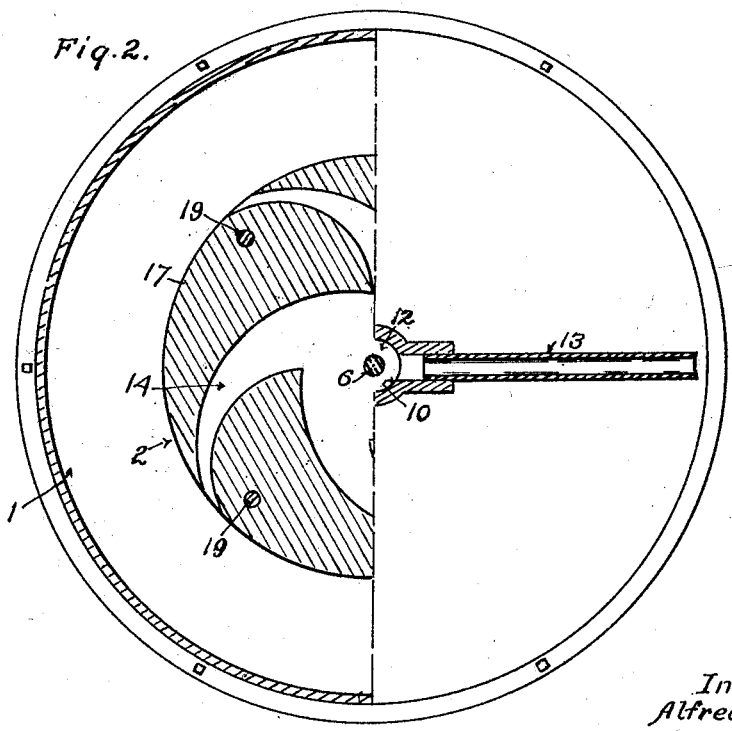
Fig. 2 is a horizontal section on line 2—2 in Fig. 1.

The pump comprises a casing or chamber 1, an impeller or runner 2, rotatively mounted in said casing and adapted to receive water, or other liquid, from suitable supply means and to force the liquid into the chamber 1 by centrifugal action due to the mass of the water so supplied, the said casing or chamber being provided with means for efflux of the liquid. The casing or chamber 1 is preferably formed as an inverted cone having an upwardly flaring conical wall for directing the water from the expanded upper portion of the chamber to the contracted lower portion to which the outlet pipe 3 is connected. A vertical column 4 extends upwardly from the base of the chamber 1 and serves as a support for a lower bearing 5 for the impeller 2, said lower bearing being formed as a step-bearing in which is rotatively mounted the lower end portion of the shaft 6 of the impeller. The upper portion of said shaft may pass through a stuffing box bearing 7 on the top of the casing or chamber 1 and may be provided with any suitable rotative driving means, for example, a pulley 8 for connection to suitable operating means. The upper bearing 7 may be mounted on a hollow vertical post 9 extending upwardly from the top of the casing 1 and having a vertical passage 10 in which the upper portion of the shaft 6 extends axially, said passage 10 communicating with an opening, or openings, 12 constituting inlet means in the top of the impeller 2 near the center thereof, and also communicating with a water supply pipe 13.

The impeller 2 is provided with channels 14 communicating at their inner ends with inlet means 12 and extending from the central portion of the impeller outwardly and rearwardly with reference to the direction of rotation of the impeller. These passages may be formed between bottom and top disk shaped portions 15 and 16 of the impeller by spacing means or members 17, which are secured to said upper and lower disk shaped portions 15 and 16 preferably in such manner as to enable adjustment of said spacing members to vary the size and shape of the outlet openings of the outwardly extending channels 14 aforesaid. For this purpose, said members 17 may be pivoted to the upper and lower disk shaped portions 15 and 16 by pivot pins or bolts 19 provided with fastening nuts 20 whereby said spacing members may be held in adjusted position.

The operation is as follows:

The shaft 6 of the impeller 2 being set in rapid rotation by driving means acting on pulley 8 and water being supplied to the water inlet 13 passes through the passage 10 and inlet 12 to the channels 14 in the impeller and by reason of the rapid rotation of the impeller the resulting centrifugal action on the water causes the same to pass outwardly and to be discharged from the periphery of the impeller into the interior of casing 1, from which it eventually passes through outlet 3. The spacing members 17 are so shaped that the channels 14 are directed radially outward and rearward, the deviation rearward from the radial direction increasing as the water passes outwardly in the channels and being sufficient at the outlet portions of the channels to cause the water to be discharged rearward at a velocity relative to the rotating impeller, which is or may be nearly equal to the forward velocity of the impeller, so that the water falls substantially "dead", or without any considerable velocity relative to the walls of the casing 1. The spacing members 17 are also so formed that the channels 14 taper or decrease in cross-section outwardly from the inlet means 12 to the discharge outlets at the periphery of the impeller for the purpose hereinafter set forth.

By adjusting the angular position of the spacing members 17 the size or cross-sectional area of the outlet end portions of the passages or channels 14 may be varied as desired, in order to control or determine the output or capacity of the pump, it being understood that as these outlet portions are contracted the capacity of the pump will be correspondingly diminished. The spacing members 17 are preferably formed with curved walls of such shape that the respective channels 14 curve outwardly and rearwardly, as stated, and taper or contract outwardly thereby giving a more effective action on the liquid with minimum friction.

I prefer to carry out the above described operation in such manner that a body of air, or other elastic medium, is retained in the casing or chamber 1 so that the impeller rotates in contact with such body of air thereby minimizing the frictional loss. When the pump is operated in this manner it is started in operation with the casing or chamber 1 more or less fully occupied with air and as the water, or other liquid, is forced into the chamber 1 the action of the impeller fills the chamber with a liquid to a certain extent and the air in the chamber is correspondingly compressed (the chamber or casing 1 being closed and air tight), this compressing action proceeding until the pressure of the air in the chamber is equal to the pressure developed at the discharge outlets of the impeller. If the outlet of the casing be closed, the flow of liquid from the impeller will then cease by reason of the fact that the pressure at the discharge outlets of the impeller is equal to the centrifugal action tending to discharge the liquid for such outlets, it being understood that the discharge outlets are made of sufficiently small cross section to permit of the gas pressure balancing and holding back the column of liquid in this manner. The impeller may then rotate within the body of gas in the chamber 1 with negligible frictional loss, the churning action which usually occurs in centrifugal pumps when the outlet is closed being substantially eliminated so that minimum loss at no load is secured. By opening the outlet valve to the pump any desired outflow of liquid may be secured according to the requirements, an equivalent inflow of liquid then taking place under the action of the impeller, and in operating in this manner under partial load a high efficiency due to low frictional loss is obtained even under conditions of relatively low load, where ordinary frictional pumps show a low efficiency.

What I claim is:

1. In a rotary centrifugal pump an impeller comprising parallel disk shaped portions, one of said portions having inlet means near the rotative axis of the impeller, and spacing members secured to and extending between said parallel disk shaped portions to form channels extending outwardly from said inlet means to the periphery of the impeller, and means for adjustably securing said spacing members to said disk shaped portions to enable variation of the size of the discharge openings for said channels.

2. A rotary centrifugal pump comprising a casing provided with upper and lower bearings, a shaft mounted to rotate in said bearings, an impeller carried by said shaft and provided with upper and lower disk shaped portions, one of said disk portions being provided with inlet means near its central portion, and means on the casing for supplying liquid to said inlet means of the impeller, and spacing members secured to and extending between said upper and lower disk shaped portions of the impeller to form channels extending outwardly from said inlet means and having discharge openings at the periphery of the impeller, and means for adjusting the position of said spacing members on said impeller to vary the size of the discharge openings thereof.

3. A rotary centrifugal pump, as set forth in claim 2, in which the said spacing members are so formed that the channels in the impeller taper or contract outwardly from the inlet means to the discharge outlets thereof.

4. A pump, as set forth in claim 2, in which said spacing members are pivotally connected to said disk shaped portions by fastening means permitting adjustment of said members.

In testimony whereof I have hereunto subscribed my name this 15th day of May, 1920.

ALFRED C. STEWART.